(12) United States Patent
Nagasaka

(10) Patent No.: US 6,661,624 B1  
(45) Date of Patent: Dec. 9, 2003

(54) SPIN-VALVE MAGNETORESISTIVE DEVICE HAVING A LAYER FOR CANCELING A LEAKAGE MAGNETIC FIELD

(75) Inventor: Keiichi Nagasaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 222 days.

(21) Appl. No.: 09/667,136

(22) Filed: Sep. 21, 2000

(30) Foreign Application Priority Data

Sep. 28, 1999 (JP) .......................................... 11-274659

(51) Int. Cl.$^7$ ................................................ G11B 5/39  
(52) U.S. Cl. ............................... 360/324.12; 360/324.11  
(58) Field of Search ....................... 360/324.11, 324.12, 360/324.2, 324.1

(56) References Cited

U.S. PATENT DOCUMENTS

| | | | | |
|---|---|---|---|---|
| 5,311,387 A | * | 5/1994 | Mallary ........................ 360/126 |
| 5,461,527 A | * | 10/1995 | Akiyama et al. ......... 360/327.32 |
| 5,661,621 A | * | 8/1997 | Kobayashi et al. ......... 360/324.1 |
| 5,880,913 A | * | 3/1999 | Gill ........................ 360/324.11 |
| 5,898,549 A | * | 4/1999 | Gill ........................ 360/324.11 |
| 5,910,344 A | * | 6/1999 | Hasegawa et al. ........... 427/127 |
| 5,958,611 A | * | 9/1999 | Ohta et al. .............. 360/324.11 |
| 6,038,107 A | * | 3/2000 | Pinarbasi ................ 360/324.11 |
| 6,243,288 B1 | * | 6/2001 | Ishikawa et al. ............. 360/313 |
| 6,301,088 B1 | * | 10/2001 | Nakada .................. 360/324.11 |
| 6,418,048 B1 | * | 7/2002 | Sin et al. ...................... 365/158 |
| 6,452,763 B1 | * | 9/2002 | Gill ........................ 360/324.11 |
| 6,456,469 B1 | * | 9/2002 | Gill ........................ 360/324.11 |
| 6,515,838 B1 | * | 2/2003 | Gill ........................ 360/324.12 |
| 6,563,680 B2 | * | 5/2003 | Gill ........................ 360/324.11 |
| 6,594,123 B1 | * | 7/2003 | Gill et al. ............... 360/324.12 |
| 6,600,638 B2 | * | 7/2003 | Gill ........................ 360/324.11 |

FOREIGN PATENT DOCUMENTS

| | | |
|---|---|---|
| JP | 7129928 | 5/1995 |
| JP | 8293107 | 11/1996 |
| JP | 9204612 | 8/1997 |
| JP | 9245318 | 9/1997 |
| JP | 9266334 | 10/1997 |
| JP | 10198927 | 7/1998 |
| JP | 11163438 | 6/1999 |
| JP | 11175925 | 7/1999 |

* cited by examiner

Primary Examiner—Jefferson Evans  
(74) Attorney, Agent, or Firm—Greer, Burns & Crain, Ltd.

(57) ABSTRACT

A spin-valve magnetoresistive device that can reproduce a signal magnetic field from a magnetic recording medium with high precision is provided. This spin-valve magnetoresistive device includes a free magnetic layer (a first ferromagnetic layer), a non-magnetic conductive layer, a multi-layered fixed magnetic layer, and an anti-ferromagnetic layer. These layers are laminated in that order. The multi-layered fixed magnetic layer includes a second ferromagnetic layer, a reverse parallel coupling intermediate layer, and a third ferromagnetic layer, which layers are laminated in that order. A fourth ferromagnetic layer that cancels a leakage magnetic field generated from the multi-layered fixed magnetic layer is disposed in contact with the anti-ferromagnetic layer.

8 Claims, 7 Drawing Sheets

THICKNESS OF
THE 4TH FERROMAGNETIC LAYER (nm)

SPIN-VALVE MAGNETORESISTIVE DEVICE HAVING A LAYER FOR CANCELING A LEAKAGE MAGNETIC FIELD

BACKGROUND OF THE INVENTION

1. Field of the Invention

The present invention generally relates to magnetoresistive devices used in a magnetic head for reading magnetized information from magnetic recording media, and, more particularly, to a spin-valve magnetoresistive device (hereinafter referred to simply as "SVMR device") utilizing giant magnetoresistive (GMR) effects. A SVMR device is a highly-sensitive magnetoresistive device that detects a magnetoresistive value change in a magnetic layer caused by a minute external magnetic field, and has been attracting more and more attention as a reproduction unit used in a high-density magnetic recording apparatus.

2. Description of the Related Art

Figure 1:
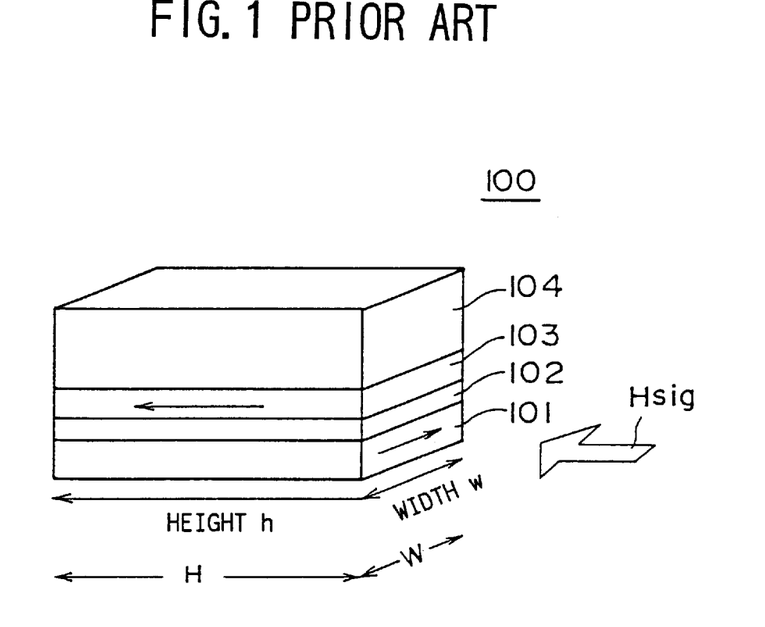
FIG. 1 shows a basic structure of a conventional SVMR device.

FIG. 1 shows the structure of a conventional SVMR device 100. This SVMR device 100 comprises a free magnetic layer 101 formed from a ferromagnetic layer, a non-magnetic conductive layer 102 formed on the free magnetic layer 101, a fixed magnetic layer 103 formed from a ferromagnetic layer on the non-magnetic conductive layer 102, and an anti-ferromagnetic layer 104 formed on the fixed magnetic layer 103. The SVMR device 100 shown in FIG. 1 is a forward-direction laminated type that has a multi-layered structure formed by a thin-film forming technique starting from the bottom layer (which is the free magnetic layer 101 in this case). Also, a SVMR device of a reverse-direction laminated type, which is laminated starting from the anti-ferromagnetic layer 104 as the bottom layer, is known and basically has the same functions as the forward-direction laminated type. In this specification, the SVMR device 100 of the forward-direction laminated type will be described.

In FIG. 1, the magnetic direction of the free magnetic layer 101 is magnetically rotated by a signal magnetic field Hsig from a magnetic recording medium. As the relative angle between the magnetic direction of the free magnetic layer 101 and the magnetic direction of the fixed magnetic layer 103 changes, the magnetic resistance of the SVMR device 100 changes accordingly. When the SVMR device 100 is used as a magnetic head for reproduction, the magnetic direction of the fixed magnetic layer 103 is fixed in the height direction H of the SVMR device 100. When no external magnetic field is applied, the magnetic direction of the free magnetic layer 101 is set in the width direction W of the device 100 and thus is perpendicular to the magnetic direction of the fixed magnetic layer 103. While the magnetic direction of the free magnetic layer 101 is perpendicular to the magnetic direction of the fixed magnetic layer 103, the signal magnetic field Hsig from the magnetic recording medium is in parallel with the magnetic direction of the fixed magnetic layer 103 or with the reverse direction of the magnetic direction of the fixed magnetic layer 103, and is perpendicular to the magnetic direction of the free magnetic layer 101. Accordingly, the magnetic resistance of the SVMR device 100 can be symmetrically detected. Such symmetrical magnetic resistance facilitates the signal processing in the magnetic recording apparatus, and the signal magnetic field Hsig from the magnetic recording medium can be reproduced with high precision.

However, a leakage magnetic field that tilts the magnetic direction of the free magnetic layer 101 exists in the vicinity of the SVMR device 100. Examples of the leakage magnetic field having adverse influence upon the free magnetic layer 101 include a magnetic field generated from the end surface of the fixed magnetic layer 103, an exchange-coupling with the anti-ferromagnetic layer generated between the fixed magnetic layer 103 and the free magnetic layer 101, and a sense current magnetic field formed by a sense current that is applied to detect the magnetic resistance of the SVMR device 100. Under the adverse influence of the leakage magnetic field, the magnetic direction of the free magnetic layer 101 deviates from the direction parallel with the width direction W toward the height direction H. As a result, the magnetic resistance variation of the SVMR device 100 in response to the signal magnetic field Hsig cannot be maintained in the symmetrical state.

To direct the magnetic direction of the free magnetic layer 101 into a parallel direction with the width direction W, a corrective magnetic field for correcting the deviation of the magnetic direction of the free magnetic layer 101 can be applied. In this specification, such a correction magnetic field for canceling a leakage magnetic field is referred to as a bias magnetic field, which is so set that the magnetic direction of the fixed magnetic layer 103 and the free magnetic layer 101 are perpendicular to each other when no external magnetic field exists in the vicinity of the SVMR device 100.

The size of the SVMR device 100 is determined by the density of a magnetic recorded material to be reproduced. Because of today's rapid increase in recording density, the distance between a magnetic recording medium and the signal magnetic field Hsig has been shrinking. To read the signal magnetic field Hsig accurately, it is necessary to reduce the width w of the SVMR device 100. However, if the width w of the SVMR device 100 is smaller than the height h of the SVMR device 100, the magnetic direction of the free magnetic layer 101 is liable to tilt into the height direction H due to shape anisotropy. Moreover, the height h needs to be reduced as the width w is reduced, since otherwise it is difficult for the signal magnetic field Hsig to enter in the height direction H.

Meanwhile, the SVMR device 100 that can be actually used in a magnetic head is submicron in size. With a smaller height h of the device 100, the adverse influence of the leakage magnetic field from the fixed magnetic layer 103 is larger. Despite this effect, the height h of the device 100 is becoming smaller as the density of the magnetic recording medium is becoming higher. Accordingly, a magnetostatic leakage magnetic field from the fixed magnetic layer 103 becomes even stronger, and the magnetic direction of the free magnetic layer 101 liable to deviate into a direction parallel to the reverse direction of the magnetic direction of the fixed magnetic layer 103.

Solutions have been suggested to eliminate the problems associated with a small height h of the device 100. One of the solutions suggests a method in which the current direction is adjusted to generate a sense current magnetic field in such a direction that cancels a leakage magnetic field from the fixed magnetic layer 103. However, a sense current of 45 $MA/cm^2$ can generate a magnetic field of only 10 Oe, for instance. In view of this, a great improvement in bias magnetic field cannot be expected from the sense current.

The magnetic quantity of the fixed magnetic layer 103 can be reduced, but the thickness of the fixed magnetic layer 103 is required to be greater than a certain thickness in order to maintain the magnetic characteristics of the SVMR device 100.

Meanwhile, a technique in which a multi-layered structure is used in place of the conventional fixed magnetic layer has been suggested. The multi-layered structure includes a ferromagnetic layer, a reverse parallel coupling intermediate layer, and another ferromagnetic layer, which layers are laminated in that order. This multi-layered structure will be hereinafter referred to as "multi-layered fixed magnetic layers". In this multi-layered fixed magnetic layer, the magnetic directions of the upper and lower ferromagnetic layers are reverse to each other, with the anti-parallel coupling intermediate layer being interposed. Accordingly, the upper and lower ferromagnetic layers cancel the magnetism of each other, and the leakage magnetic field applied to the free magnetic layer becomes smaller. Since the multi-layered fixed magnetic layer is normally formed by one magnetic material, the upper and lower ferromagnetic layers have the same thickness, which effectively nullifies the effect of the leakage magnetic field on the free magnetic layer.

Taking the function of a SVMR device into account, however, the upper and the lower ferromagnetic layers should be different in thickness so as to improve the magnetic properties such as unidirectional anisotropic magnetic field (Hua) and magnetoresistive effects. More specifically, the ferromagnetic layer in contact with the anti-ferromagnetic layer is made thinner, while the ferromagnetic layer in contact with the non-magnetic conductive layer is made thicker. With such a layered structure, it is apparently difficult to cancel a leakage magnetic field generated from the fixed magnetic layer.

SUMMARY OF THE INVENTION

A general object of the present invention is to provide a spin-valve magnetoresistive device in which the above disadvantages are eliminated.

A more specific object of the present invention is to provide a spin-valve magnetoresistive device that can prevent deviation of the magnetic direction of a free magnetic layer so that a signal magnetic field from a magnetic recording medium can be reproduced with high precision.

The above objects of the present invention are achieved by a spin-valve magnetoresistive device comprising a free magnetic layer as a first ferromagnetic layer, a non-magnetic conductive layer, a laminated fixed magnetic layer, an anti-ferromagnetic layer, and a fourth ferromagnetic layer that cancels a leakage magnetic field. In this spin-valve magnetoresistive device, the laminated fixed magnetic layer includes a second ferromagnetic layer, a reverse parallel coupling intermediate layer, and a third ferromagnetic layer, which layers are laminated in that order. Also in this spin-valve magnetoresistive device, the free magnetic layer, the non-magnetic conductive layer, the laminated fixed magnetic layer, the anti-ferromagnetic layer, and the fourth ferromagnetic layer, are laminated in that order or the reverse order.

Since the second ferromagnetic layer and the third ferromagnetic layer have opposite magnetic directions, with the reverse parallel coupling intermediate layer being interposed therebetween, a leakage magnetic field generated from the laminated fixed magnetic layer is restricted. Also, the magnetism of the fourth magnetic layer is set in such a direction that cancels the leakage magnetic field. Thus, the leakage magnetic field can be surely cancelled, and the magnetic direction of the free magnetic layer can be prevented from deviating.

With this spin-valve magnetoresistive device, a signal magnetic field from a magnetic recording medium can be reproduced with high precision.

The above objects of the present invention are also achieved by a spin-valve magnetoresistive device comprising: a first multi-layered structure that includes a free magnetic layer as a first ferromagnetic layer, a non-magnetic conductive layer, a fixed magnetic layer as a second ferromagnetic layer; and an anti-ferromagnetic layer, in that order or in the reverse order; and a second multi-layered structure that cancels a leakage magnetic field, and includes a third ferromagnetic layer, a reverse parallel coupling intermediate layer, and a fourth ferromagnetic layer, in that order. In this spin-valve magnetoresistive device, the second multi-layered structure is placed on the anti-ferromagnetic-layer side of the first multi-layered structure.

Since the second multi-layered structure cancels a leakage magnetic field from the fixed magnetic layer of the first multi-layered structure, the magnetic direction of the free magnetic layer does not deviate. Accordingly, a signal magnetic field from a magnetic recording medium can be reproduced with high precision.

The above objects of the present invention are also achieved by a spin-valve magnetoresistive device comprising: a free magnetic layer interposed between two symmetrical sets of a non-magnetic conductive layer, a fixed magnetic layer and an anti-ferromagnetic layer; and a leakage-canceling ferromagnetic layer that cancels a leakage magnetic field, and is disposed on at least one of the anti-ferromagnetic layers. In this spin-valve magnetoresistive device, the fixed magnetic layer has either a single-layered structure or a multi-layered structure that includes a ferromagnetic layer, a reverse parallel coupling intermediate layer, and another ferromagnetic layer, which layers are laminated in that order. Also, the leakage-canceling ferromagnetic layer has either a single-layered structure or a multi-layered structure that includes a ferromagnetic layer, a reverse parallel coupling intermediate layer, and another ferromagnetic layer, which layers are laminated in that order. When the fixed magnetic layer has the single-layered structure, the leakage-canceling ferromagnetic layer has the multi-layered structure. When the fixed magnetic layer has the multi-layered structure, the leakage-canceling ferromagnetic layer has the single-layered structure.

With the above dual-type SVMR device, a leakage magnetic field that has adverse influence upon the free magnetic layer can be canceled, and a signal magnetic field from a magnetic recording medium can be reproduced with high precision.

The above and other objects and features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

Figure 2:
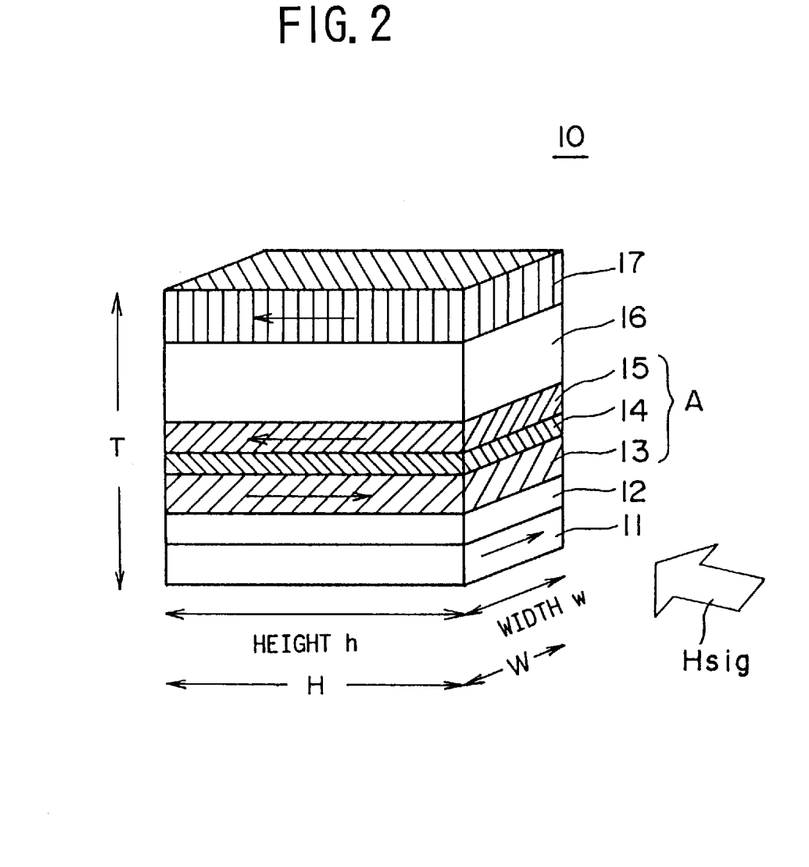
FIG. 2 is a schematic view of the structure of a first embodiment of a spin-valve magnetoresistive device in accordance with the present invention.

FIG. 2 shows the fundamental structure of a first embodiment of the spin-valve magnetoresistive device of the present invention. This SVMR device 10 is of a forward-direction laminated type, and comprises a free magnetic layer 11 as a first ferromagnetic layer, a non-magnetic conductive layer 12, a laminated fixed magnetic layer A, an anti-ferromagnetic layer 16, and a fourth ferromagnetic layer 17 that cancels a leakage magnetic field, in that order from the bottom. The free magnetic layer 11, the non-magnetic conductive layer 12, the laminated fixed magnetic layer A, and the anti-ferromagnetic layer 16 constitute the fundamental structure of a SVMR device. The laminated fixed magnetic layer A comprises a second ferromagnetic layer (a second fixed magnetic layer in the first embodiment) 13, a reverse parallel coupling intermediate layer 14, and a third ferromagnetic layer (a first fixed magnetic layer in the first embodiment) 15, in that order from the bottom.

The free magnetic layer 11 is made of a magnetic material, such as a nickel-iron (Ni—Fe) alloy or a nickel-cobalt (Ni—Co) alloy, and has a thickness of 2 to 6 nm. The non-magnetic conductive layer 12 is made of a conductive material, such as copper (Cu), and has a thickness of 2 to 4 nm. The anti-ferromagnetic layer 16 is made of a magnetic material, such a nickel-manganese (Ni—Mn) alloy, and has a thickness of 10 to 30 nm. The laminated fixed magnetic layer A includes three layers made up of cobalt-iron/ruthenium/cobalt-iron (Co—Fe/Ru/Co—Fe), and has a thickness of 4 to 6 nm.

The fourth ferromagnetic layer 17 is made of a magnetic material, such as a nickel-iron (Ni—Fe) alloy, and has a thickness of 1 to 5 nm.

More specifically, in this embodiment, the first fixed magnetic layer 15 and the second fixed magnetic layer 13 were made of the same magnetic material, a cobalt-iron (Co—Fe) alloy (residual magnetism density: 1.5 tesla (T)). The thickness of the first fixed magnetic layer 15 was approximately 1 nm, while the thickness of the second fixed magnetic layer 13 was approximately 2 nm. The reverse parallel coupling intermediate layer 14 interposed between the first and second fixed magnetic layers 15 and 13 was made of ruthenium, and had a thickness of approximately 0.8 nm. The reverse parallel coupling intermediate layer 14 had a function to put the magnetic directions of the adjacent upper and lower ferromagnetic layers into a reverse parallel state. Accordingly, the magnetic directions of the second fixed magnetic layer 13 and the first fixed magnetic layer 15 were in parallel but in the opposite directions, as shown in FIG. 2.

The anti-ferromagnetic layer 16 on the first fixed magnetic layer 15 was made of palladium-platinum-manganese (Pd—Pt—Mn). To determine the influence of the thickness of the anti-ferromagnetic layer 16 upon a leakage magnetic field, the thickness of the anti-ferromagnetic layer 16 was varied between 10 nm and 25 nm, depending on the first fixed magnetic layer 15, the second fixed magnetic layer 13, and the reverse parallel coupling intermediate layer 14.

The fourth ferromagnetic layer 17 on the anti-ferromagnetic layer 16 was made of a nickel-iron (Ni—Fe) alloy (residual magnetism density: 1 tesla (T)). To determine the influence of the thickness of the fourth ferromagnetic layer 17 upon a leakage magnetic field, the thickness of the fourth ferromagnetic layer 17 was varied between 0, 1, 2, 3, 4, and 5 nm, also depending on the first fixed magnetic layer 15, the second fixed magnetic layer 13, and the reverse parallel coupling intermediate layer 14. Here, the anti-ferromagnetic layer 16 was 25 nm thick. It should be noted that the magnetic direction of the fourth ferromagnetic layer 17 is the same as the magnetic direction of the first fixed magnetic layer 15.

The free magnetic layer 11 was formed of laminated layers of Ni—Fe/Co—Fe having a thickness of approximately 4 nm. The non-magnetic conductive layer 12 interposed between the free magnetic layer 11 and the second fixed magnetic layer 13 was made of copper and was approximately 3-nm thick.

The SVMR devices 10 having the above structure ware approximately 1 $\mu$m in width, and varied between 0.2 to 1 $\mu$m in height.

The magnetic directions of the first fixed magnetic layer 15 and the second fixed magnetic layer 13 are in the opposite directions so as to cancel the magnetism of each other and thus not to generate a leakage magnetic field. However, the second fixed magnetic layer 13 needs to be thicker than the first fixed magnetic layer 15, so that the SVMR device 10 functions properly. With the difference in thickness, the first fixed magnetic layer 15 and the second fixed magnetic layer 13 cannot be magnetically closed, which results in a leakage magnetic field. Such a leakage magnetic field causes the magnetic direction of the free magnetic layer 11 to deviate. In view of this, a leakage magnetic field applied from the laminated fixed magnetic layer A to the free magnetic layer 11 was measured.

Detected points of the leakage magnetic field were located at 0.02 $\mu$m intervals in the height direction H of the SVMR device 10, and also on the center line of the free magnetic layer 11 in the thickness direction T. The average value of the leakage magnetic field components (Hx-ave.) in the height direction H was calculated.

Figure 3:
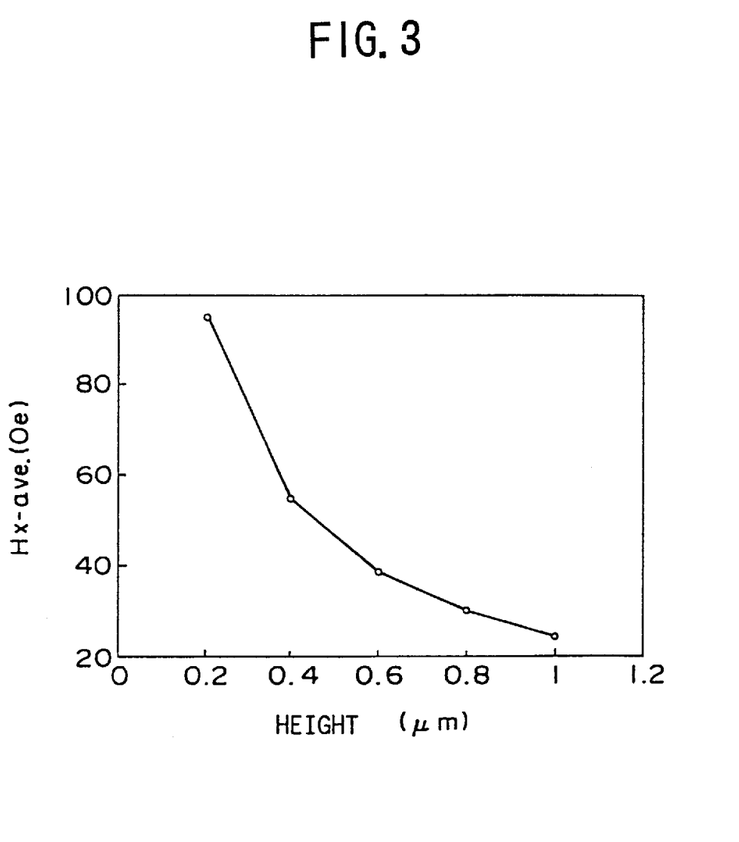
FIG. 3 shows the relationship between an average value of leakage magnetic field components (Hx-ave.) and the height of a conventional SVMR device having a multi-layered fixed magnetic layer.

FIG. 3 shows the relationship between the average value of the leakage magnetic field components (Hx-ave.) and the height h of a conventional SVMR device having a laminated fixed magnetic layer structure without the fourth ferromagnetic layer 17. This is shown for comparison with the average value of the leakage magnetic field components (Hx-ave.) of the SVMR device 10 of this embodiment. As can be seen from FIG. 3, the average value of the leakage magnetic field components (Hx-ave.) depended on the height h of the device, and became greater as the height h became smaller. When the height h was 0.2 $\mu$m, for instance, the average value of the leakage magnetic field components (Hx-ave.) was greater than 90 Oe, and thus the influence of a leakage magnetic field was very large.

Figure 4:
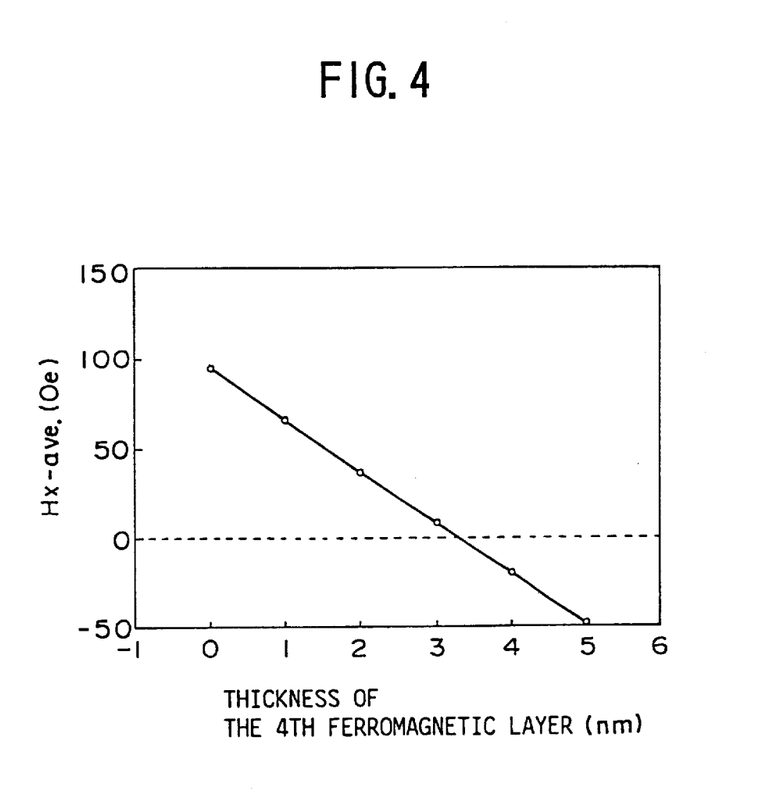
FIG. 4 shows the relationship between the average value of the leakage magnetic field components (Hx-ave.) and the thickness of a fourth ferromagnetic layer disposed on a first fixed magnetic layer via an anti-ferromagnetic layer in the first embodiment.

FIG. 4 shows the relationship between the average value of the leakage magnetic field components (Hx-ave.) and the thickness of the fourth ferromagnetic layer 17 formed on the first fixed magnetic layer 15 via the anti-ferromagnetic layer 16 in accordance with the first embodiment of the present invention. The thickness of the fourth magnetic layer 17 was varied between 0, 1, 2, 3, 4, and 5 nm. The thickness of the anti-ferromagnetic layer 16 was 25 nm, and the height h was 0.2 μm.

As can be seen from FIG. 4, even with the height h of 0.2 μm, which height is the smallest, the average value of the leakage magnetic field components (Hx-ave.) decreased as the thickness of the fourth ferromagnetic layer 17 increased. When the thickness of the fourth ferromagnetic layer 17 was 3 nm, the average value of the leakage magnetic field components (Hx-ave.) almost dropped to zero. Accordingly, it was confirmed that a leakage magnetic field applied to the free magnetic layer 11 could be cancelled by adjusting the thickness of the fourth ferromagnetic layer 17 formed on the anti-ferromagnetic layer 16.

Figure 5:
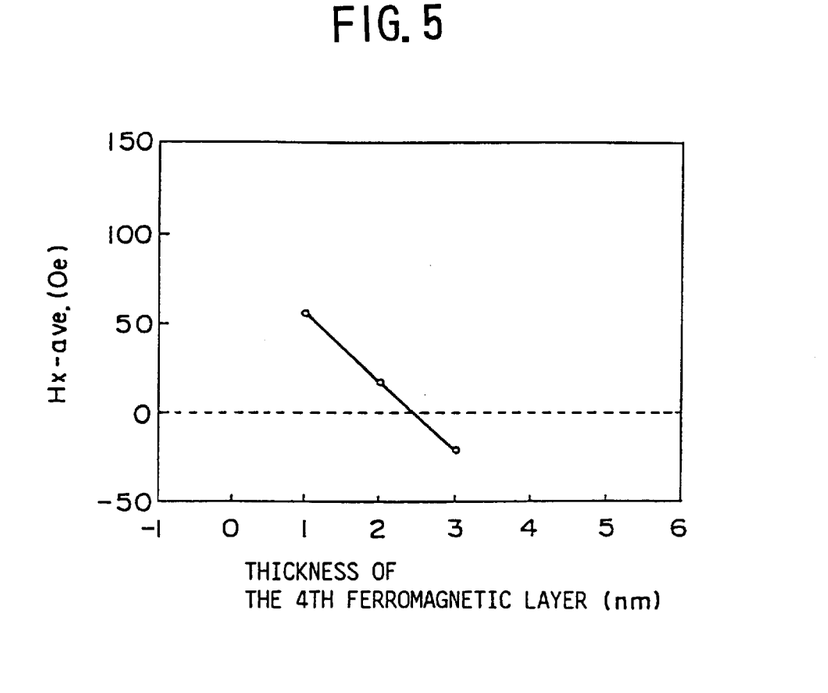
FIG. 5 shows the relationship between the average value of the leakage magnetic field components (Hx-ave.) and the thickness of the fourth ferromagnetic layer, with the anti-ferromagnetic layer being 10 nm thick.

FIG. 5 shows the relationship between the average value of the leakage magnetic field components (Hx-ave.) and the thickness of the fourth ferromagnetic layer 17, with the thickness of the anti-ferromagnetic layer 16 being 10 nm. As can be seen from FIG. 5, when the average value of the leakage magnetic field components (Hx-ave.) was zero, the thickness of the fourth ferromagnetic layer 17 was approximately 2.5 nm, which is smaller than in FIG. 4. Accordingly, it was found that, even when the fourth ferromagnetic layer 17 was thin, the average value (Hx-ave.) could be made zero by placing the fourth ferromagnetic layer 17 close to the fixed magnetic layer (or the laminated fixed magnetic layer A).

Since a magnetic field generated from a magnetic layer normally depends on the quantity of magnetism of the magnetic layer as well as on the thickness of the magnetic layer, the fourth ferromagnetic layer 17 can be made even thinner by employing a magnetic material having a larger quantity of magnetism than the nickel-iron alloy used for the fourth ferromagnetic layer 17 of the first embodiment.

A leakage magnetic field applied to a SVMR device which is actually used in a magnetic head may be an exchange-coupling with the anti-ferromagnetic layer that is ferromagnetically generated between a fixed magnetic layer and a free magnetic layer, or a leakage magnetic field generated from a sense current magnetic field by a sense current. However, as is apparent from the description of the first embodiment, a suitable magnetic material having a desired thickness may be selected for the fourth ferromagnetic layer 17 so as to control the quantity of magnetism. Thus, a leakage magnetic field applied to the free magnetic layer 11 can be nullified.

The SVMR device 10 of the first embodiment can be formed by a thin-film forming method using a lithography technique and a film forming technique such as sputtering or vapor deposition. An alumina or ceramic substrate may be used, and a plurality of films are laminated on the substrate one by one, thereby forming the SVMR device 10.

In this embodiment, a regular alloy is used for the anti-ferromagnetic layer 16. Accordingly, when the anti-ferromagnetic layer 16 is regulated in the production procedures, the magnetic directions of the fourth ferromagnetic layer 17 and the first fixed magnetic layer 15 both in contact with the anti-ferromagnetic layer 16 can be fixed in the same direction.

Although the SVMR device 10 of the first embodiment is of a forward-direction laminated type, a SVMR device of a reverse-direction laminated type can have the same effects.

Figure 6:
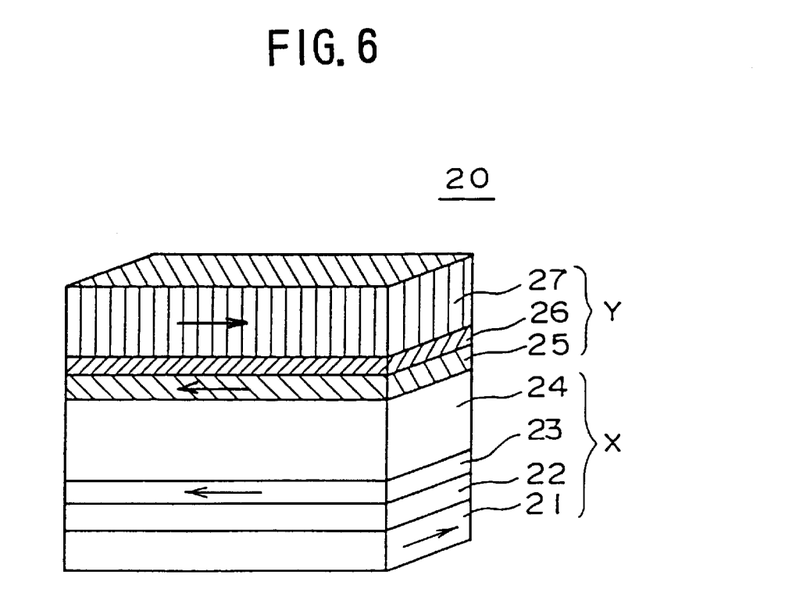
FIG. 6 is a schematic view of the structure of a second embodiment of the spin-valve magnetoresistive device in accordance with the present invention.

FIG. 6 shows a SVMR device 20 of a second embodiment of the present invention. A first multi-layered structure X on the lower side is the fundamental structure of a SVMR device, and comprises a free magnetic layer 21 as a first ferromagnetic layer, a non-magnetic conductive layer 22, a fixed magnetic layer 23 as a second ferromagnetic layer, and an anti-ferromagnetic layer 24, in that order from the bottom. The fixed magnetic layer 23 generates a leakage magnetic field that tilts the magnetic direction of the free magnetic layer 21. Therefore, the SVMR device 20 of the second embodiment is further provided with a second multi-layered structure Y on the anti-ferromagnetic layer 24 so as to cancel the leakage magnetic field.

The second multi-layered structure Y comprises a third ferromagnetic layer 25, an anti-parallel coupling intermediate layer 26, and a fourth ferromagnetic layer 27, in that order from the bottom.

The magnetic direction of the fixed magnetic layer 23 and the magnetic direction of the third ferromagnetic layer 25 are the same, with the anti-ferromagnetic layer 24 being interposed between the fixed magnetic layer 23 and the third ferromagnetic layer 25. When the anti-ferromagnetic layer 24 is annealed to induce ordering therein, the magnetic directions of the fixed magnetic layer 23 and the third ferromagnetic layer 25 can be fixed at the same time. However, in this situation, the leakage magnetic field applied to the free magnetic layer 21 increases further with the magnetic field generated from the third ferromagnetic layer 25.

To counter this problem, in the second embodiment, the anti-parallel coupling intermediate layer 26 and the fourth ferromagnetic layer 27 are laminated on the third ferromagnetic layer 25. The magnetic direction of the fourth ferromagnetic layer 27 is opposite to the magnetic direction of the third ferromagnetic layer 25 (and the fixed magnetic layer 23) via the reverse parallel coupling intermediate layer 26. Accordingly, the leakage magnetic field generated from the fixed magnetic layer 23 and the third ferromagnetic layer 25 can be cancelled by adjusting the quantity of magnetism of the fourth ferromagnetic layer 27.

The fourth ferromagnetic layer 27 of the second mulit-layered structure Y should have a greater quantity of magnetism than the third ferromagnetic layer 25 so as to cancel the leakage magnetic field generated from the fixed magnetic layer 23 and the third ferromagnetic layer 25. If the same magnetic material is used for the third ferromagnetic layer 25 and the fourth ferromagnetic layer 27, the fourth ferromagnetic layer 27 becomes thicker.

Although the SVMR device 20 of this embodiment is of a forward-direction laminated type, it is of course possible to produce a SVMR device of a reverse-direction laminated type in the same manner.

The SVMR device 20 of this embodiment can be formed by a thin-film forming technique using any of the magnetic materials mentioned in the description of the first embodiment.

Figure 7:
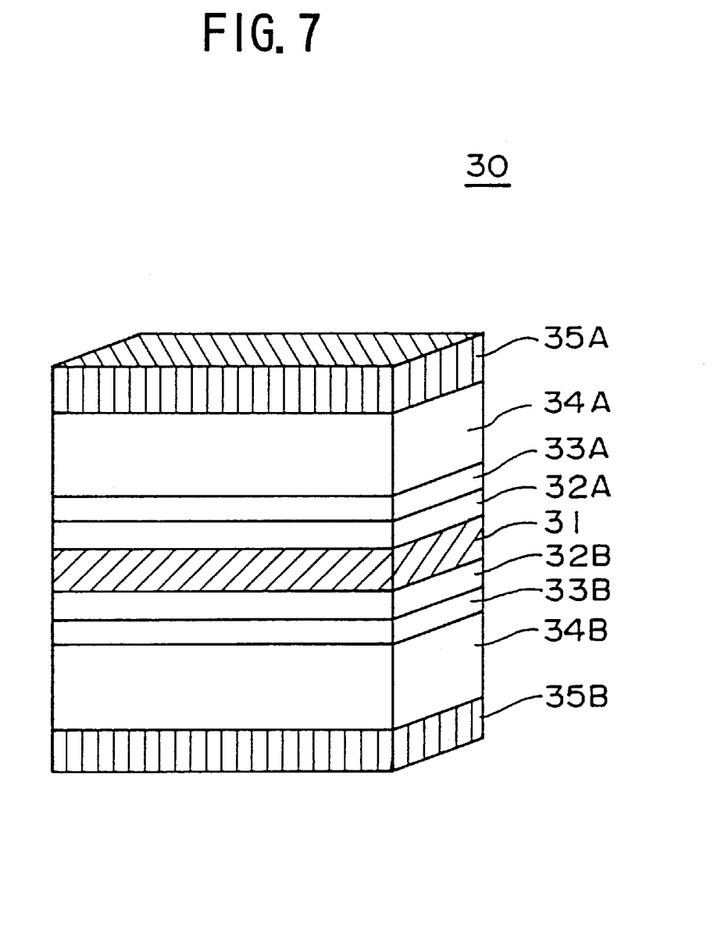
FIG. 7 is a schematic view of the structure of a third embodiment of the spin-valve magnetoresistive device in accordance with the present invention.

FIG. 7 shows a SVMR device 30 of a third embodiment of the present invention. This SVMR device 30 is of a dual type.

With a free magnetic layer 31 being placed in the middle, non-magnetic conductive layers 32A and 32B, fixed magnetic layers 33A and 33B, anti-ferromagnetic layers 34A and 34B, and ferromagnetic layers 35A and 35B for canceling a leakage magnetic field are symmetrically laminated. In this dual-type SVMR device 30, the thickness of each of the ferromagnetic layers 35A and 35B is adjusted so as to cancel a leakage magnetic field generated from the fixed magnetic layers 33A and 33B, for instance.

Each of the fixed magnetic layers 33A and 33B may have either a single-layered structure or a multi-layered structure that comprises a ferromagnetic layer, a reverse parallel coupling intermediate layer, and another ferromagnetic layer. The fixed magnetic layers 33A and 33B do not necessarily have the same structure. Rather, one of the fixed magnetic layers 33A and 33B can have a single-layered structure while the other has a multi-layered structure.

Likewise, each of the ferromagnetic layers 35A and 35B may have a single-layered structure or a multi-layered structure that comprises a ferromagnetic layer, a reverse parallel coupling intermediate layer, and another ferromagnetic layer. The ferromagnetic layers 35A and 35B do not necessarily have the same structure. Rather, one of the ferromagnetic layers 35A and 35B can have a single-layered structure while the other has a multi-layered structure. Furthermore, the ferromagnetic layers 35A and 35B do not necessarily serve as the uppermost layer and the lowermost layer of the SVMR device 30. On the contrary, it is possible to place one ferromagnetic layer as either the uppermost layer or the lowermost layer to cancel the leakage magnetic field.

If the fixed magnetic layer 33A (33B) is a single-layered structure, however, the ferromagnetic layer 35A (35B) disposed on the fixed magnetic layer 33A (33B) via the anti-ferromagnetic layer 34A (34B) should have a multi-layered structure. If the fixed magnetic layer 33A (33B) is a multi-layered structure, the ferromagnetic layer 35A (35B) disposed on the fixed magnetic layer 33A (33B) via the anti-ferromagnetic layer 34A (34B) should have a single-layered structure. As is also apparent from the first and second embodiments, when the fixed magnetic layer is a multi-layered fixed magnetic layer, a single-layered ferromagnetic layer cancels the leakage magnetic field. When the fixed magnetic layer is a single-layered fixed magnetic layer, a multi-layered ferromagnetic layer cancels the leakage magnetic field.

In the dual-type SVMR device 30 of the third embodiment, a leakage magnetic field that tilts the magnetic direction of the free magnetic layer 31 is restricted, and a signal magnetic field Hsig can be detected with high precision.

Figure 8:
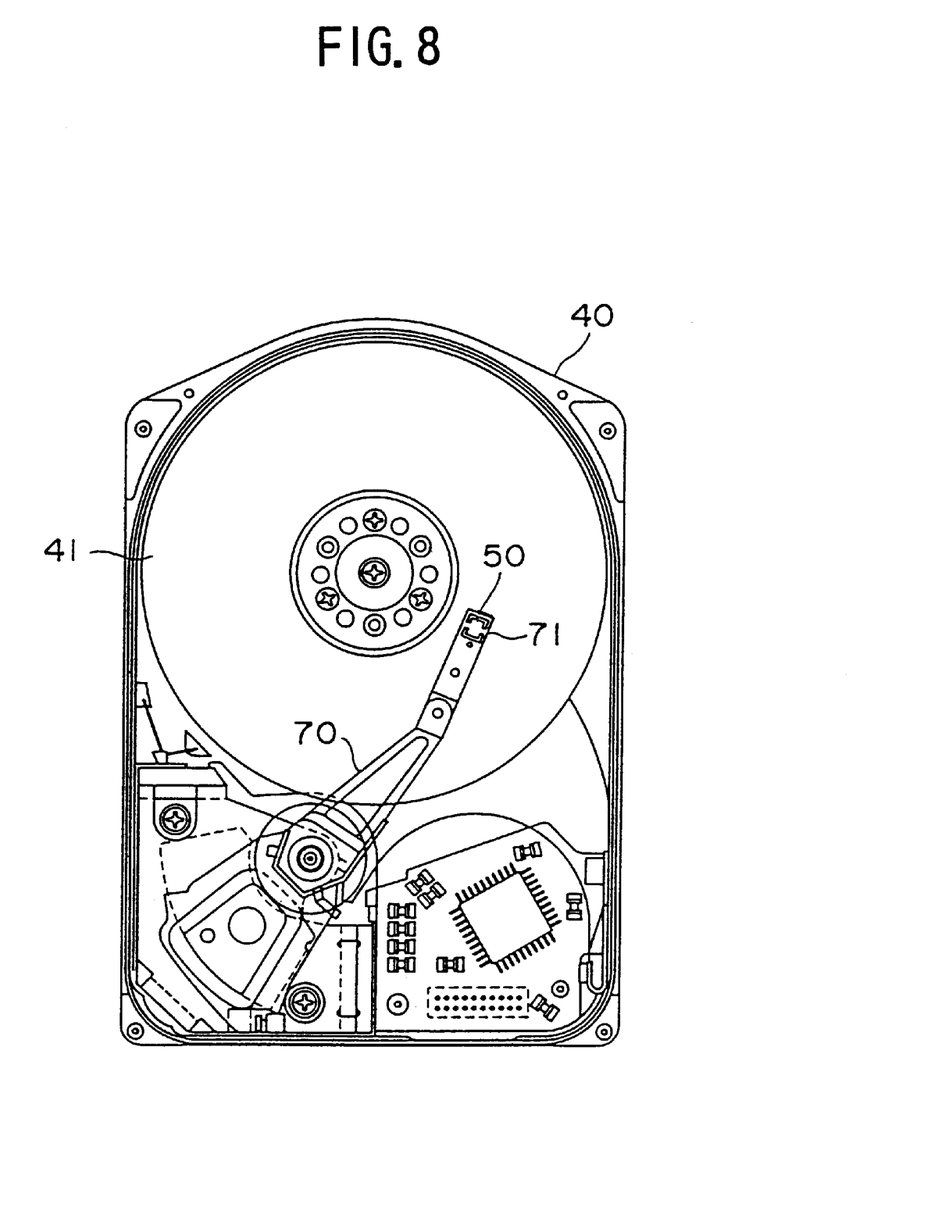
FIG. 8 shows a magnetic recording medium driving apparatus that uses the SVMR device of the first embodiment of the present invention.

FIG. 8 shows a magnetic recording medium driving apparatus 40 that is equipped with a read head using the SVMR device of the present invention. A hard disk 41 as a magnetic recording medium is mounted on the magnetic recording medium driving apparatus 40. A composite magnetic head 50 provided with the SVMR device 10 of the first embodiment on the read side facing the surface of the hard disk 41 performs a magnetic reproduction operation. This composite head 50 is secured to the front end of a slider 71 attached to the top end of an arm 70. A double-actuator having a normal actuator and an electromagnetic actuator positions the magnetic head 50.

The present invention is not limited to the specifically disclosed embodiments, but variations and modifications may be made without departing from the scope of the present invention.

The present application is based on Japanese priority application No. 11-274659, filed on Sep. 28, 1999, the entire contents of which are hereby incorporated by reference.

What is claimed is:

1. A spin-valve magnetoresistive device comprising:
   a free magnetic layer as a first ferromagnetic layer;
   a non-magnetic conductive layer;
   a laminated fixed magnetic layer that includes a second ferromagnetic layer, a reverse parallel coupling intermediate layer, and a third ferromagnetic layer, which are laminated in that order;
   an anti-ferromagnetic layer; and
   a fourth ferromagnetic layer that cancels a leakage magnetic field, said fourth ferromagnetic layer setting a direction of magnetization of said free magnetic layer in a direction perpendicular to a magnetization direction of said laminated fixed magnetic layer in the absence of an external magnetic field,
   wherein the free magnetic layer, the non-magnetic conductive layer, the laminated fixed magnetic layer, the anti-ferromagnetic layer, and the fourth ferromagnetic layer, are laminated in that order or the reverse order.

2. The spin-valve magnetoresistive device as claimed in claim 1, wherein
   the fourth ferromagnetic layer is in contact with the anti-ferromagnetic layer, so that a magnetic direction thereof is fixed in the same magnetic direction as the third ferromagnetic layer by virtue of an exchange-coupling with the anti-ferromagnetic layer.

3. The spin-valve magnetoresistive device as claimed in claim 1, wherein
   a quantity of magnetism of the fourth ferromagnetic layer is set so that a magnetic field formed by the fourth ferromagnetic layer and the third ferromagnetic layer cancels the leakage magnetic field.

4. A spin-valve magnetoresistive device comprising:
   a first multi-layered structure that includes a free magnetic layer as a first ferromagnetic layer, a non-magnetic conductive layer, a fixed magnetic layer as a second ferromagnetic layer, and an anti-ferromagnetic layer, in that order or in the reverse order; and
   a second multi-layered structure that cancels a leakage magnetic field, and includes a third ferromagnetic layer, a reverse parallel coupling intermediate layer, and a fourth ferromagnetic layer, in that order, said second multi-layered structure sets a direction of magnetization of said free magnetic layer in a direction perpendicular to a magnetization direction of said fixed magnetic layer in the absence of an external magnetic field,
   wherein the second multi-layered structure is placed on the opposite side of the anti-ferromagnetic layer from the first multi-layered structure.

5. The spin-valve magnetoresistive device as claimed in claim 4, wherein
   the third ferromagnetic layer is in contact with the anti-ferromagnetic layer so that a magnetic direction thereof is fixed in the same magnetic direction as the fixed magnetic layer by virtue of an exchange-coupling with the anti-ferromagnetic layer.

6. The spin-valve magnetoresistive device as claimed in claim 5, wherein
   a quantity of magnetism of the fourth ferromagnetic layer is set so that a magnetic field formed by the fourth ferromagnetic layer cancels the leakage magnetic field.

7. A spin-valve magnetoresistive device comprising:
   a free magnetic layer interposed between two symmetrical sets of a non-magnetic conductive layer, a fixed magnetic layer and an anti-ferromagnetic layer; and
   a leakage-canceling ferromagnetic layer, said leakage-canceling ferromagnetic layer setting a direction of magnetization of said free magnetic layer in a direction perpendicular to a magnetization direction of said fixed magnetic layer in the absence of an external magnetic field, wherein:

the fixed magnetic layer has either a single-layered structure or a multi-layered structure that includes a ferromagnetic layer, a reverse parallel coupling intermediate layer, and another ferromagnetic layer, which layers are laminated in that order; and the leakage-canceling ferromagnetic layer has either a single-layered structure or a multi-layered structure that includes a ferromagnetic layer, a reverse parallel coupling intermediate layer, and another ferromagnetic layer, which layers are laminated in that order.

8. The spin-valve magnetoresistive device as claimed in claim 7, wherein:

when the fixed magnetic layer has the single-layered structure, the leakage-canceling ferromagnetic layer has the multi-layered structure; and when the fixed magnetic layer has the multi-layered structure, the leakage-canceling ferromagnetic layer has the single-layered structure.

* * * * *